United States Patent
Bolenbaugh

(10) Patent No.: US 9,139,177 B1
(45) Date of Patent: Sep. 22, 2015

(54) METHOD OF CONTROLLING THE BRAKE BIAS IN A VEHICLE BRAKING SYSTEM

(71) Applicant: GM GLOBAL TECHNOLOGY OPERATIONS LLC, Detroit, MI (US)

(72) Inventor: Jonathan M. Bolenbaugh, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/273,865

(22) Filed: May 9, 2014

(51) Int. Cl.
*B60T 8/26* (2006.01)
*B60T 8/17* (2006.01)
*B60T 8/172* (2006.01)
*B60L 7/18* (2006.01)

(52) U.S. Cl.
CPC . *B60T 8/267* (2013.01); *B60L 7/18* (2013.01); *B60T 8/17* (2013.01); *B60T 8/172* (2013.01); *B60T 8/26* (2013.01)

(58) Field of Classification Search
CPC ........... B60T 8/267; B60T 8/26; B60T 8/266; B60T 8/172; B60L 7/18
See application file for complete search history.

(56) References Cited

U.S. PATENT DOCUMENTS

| | | | |
|---|---|---|---|
| 6,691,013 B1 * | 2/2004 | Brown | 701/70 |
| 2008/0100129 A1 * | 5/2008 | Lubbers | 701/70 |
| 2013/0211644 A1 * | 8/2013 | Yokoyama et al. | 701/22 |

OTHER PUBLICATIONS

Brake Balance or Brake Bias, www.formula1-dictionary.net, 3 pages.

* cited by examiner

*Primary Examiner* — Thomas Tarcza
*Assistant Examiner* — Kevin Myhre
(74) *Attorney, Agent, or Firm* — Lionel D. Anderson; Reising Ethington P.C.

(57) ABSTRACT

A method and system for controlling the overall brake bias in a vehicle braking system having both frictional and regenerative braking devices. The method comprises receiving a brake bias command and determining a desired brake bias based on the brake bias command. The method further comprises changing the brake bias in the vehicle braking system to achieve the desired brake bias through the operation of one or more regenerative braking devices. The system comprises one or more regenerative braking devices, each configured to apply negative torque to one of a first axle or a second axle of the vehicle, and an electronic module, for example, an electronic brake control module (EBCM) that is configured to perform the above-described methodology.

Figure 1:
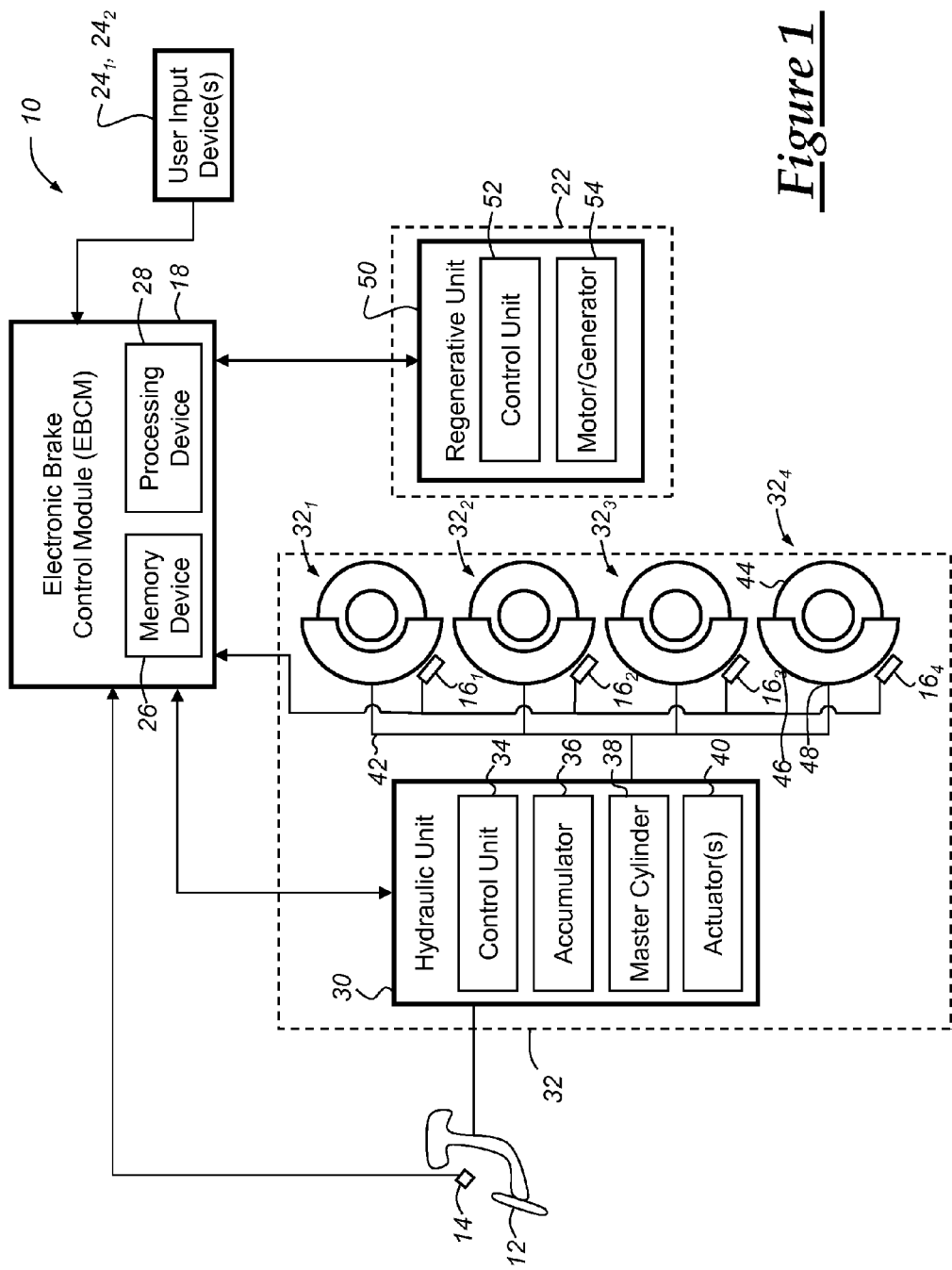

19 Claims, 2 Drawing Sheets

METHOD OF CONTROLLING THE BRAKE BIAS IN A VEHICLE BRAKING SYSTEM

FIELD

The present invention generally relates to vehicle braking systems and, more particularly, to a method of controlling the brake bias in a vehicle braking system having both frictional and regenerative braking devices.

BACKGROUND

It is well known that a braking system of a vehicle generally includes a plurality of braking devices, each of which is operatively coupled to an axle of the vehicle and configured to apply a negative torque thereto (also referred to below as a "negative axle torque" or "brake torque"). These braking devices may comprise frictional braking devices (e.g., disc brakes, drum brakes, and electro-hydraulic brakes, to cite a few possibilities), regenerative braking devices (e.g., electric motors), or a combination of both. For example, a hybrid vehicle having a first and a second axle may include a pair of frictional braking devices operatively coupled to the first axle, a pair of frictional braking devices operatively coupled to the second axles, and one or more regenerative braking devices each operatively coupled to one of the first or second axles of the vehicle.

The vehicle braking system also has a brake bias associated therewith. For the purposes of this disclosure, brake bias relates to the amount of negative torque applied to one axle of the vehicle by one or more braking devices operatively coupled thereto compared to the amount of brake torque applied to another axle of the vehicle by one or more braking device operatively coupled thereto. During the operation of a vehicle, it may be desirable to adjust the brake bias in the braking system so that the negative axle torque is biased towards one axle or another to enhance the driving experience. For example, when a high performance vehicle having a front and a rear axle is entering a corner or turn of a race track, it may be desirable and/or beneficial to bias the negative axle torque toward the front axle to shift more of the weight of the vehicle to the front, thereby causing the vehicle to turn into the corner or turn. While in certain instances it may be desirable and/or beneficial to bias the negative axle torque toward one axle or another, in other instances, a more balanced torque configuration or arrangement may be desirable and/or beneficial. For example, when the performance vehicle in the example above exits or comes out of the corner or turn and once again operates in a straight line (e.g., along a straight away of the race track), it may be desirable and/or beneficial to have a more balanced brake bias configuration to enhance or optimize the acceleration of the vehicle. Accordingly, it may be desirable to adjust the brake bias such that the application of negative axle torque is more balanced between the front and rear axles of the vehicle.

SUMMARY

According to one embodiment, there is provided a method of controlling the overall brake bias in a vehicle braking system having both frictional and regenerative braking devices. The method may comprise the steps of: receiving a brake bias command; determining a desired brake bias based on the brake bias command; and changing the overall brake bias in the vehicle braking system to achieve the desired brake bias through the operation of one or more regenerative braking devices.

According to another embodiment, there is provided a method for controlling the overall brake bias in a vehicle braking system having both frictional and regenerative braking devices. The method may comprise the steps of: receiving a brake bias command; determining a desired brake bias based on the brake bias command; determining a total amount of commanded negative torque to be applied to the first and second axles of the vehicle during a braking event; and during the braking event, changing the overall brake bias in the vehicle braking system to achieve the desired brake bias through the operation of one or more regenerative braking devices, while maintaining the total amount of negative torque applied to the first and second axles of the vehicle at a level that is approximately equal to the total amount of commanded negative torque.

According to yet another embodiment, there is provided a braking system for a vehicle. The system may comprise: one or more regenerative braking devices, each configured to apply negative torque to one of a first axle or a second axle of the vehicle; and an electronic module, for example, an electronic brake control module (EBCM). The electronic module is configured to: receive a brake bias command; determine a desired brake bias based on the brake bias command; and control the operation of at least one of the one or more regenerative braking devices to change the overall brake bias in the vehicle braking system to achieve the desired brake bias.

DRAWINGS

Figure 2:
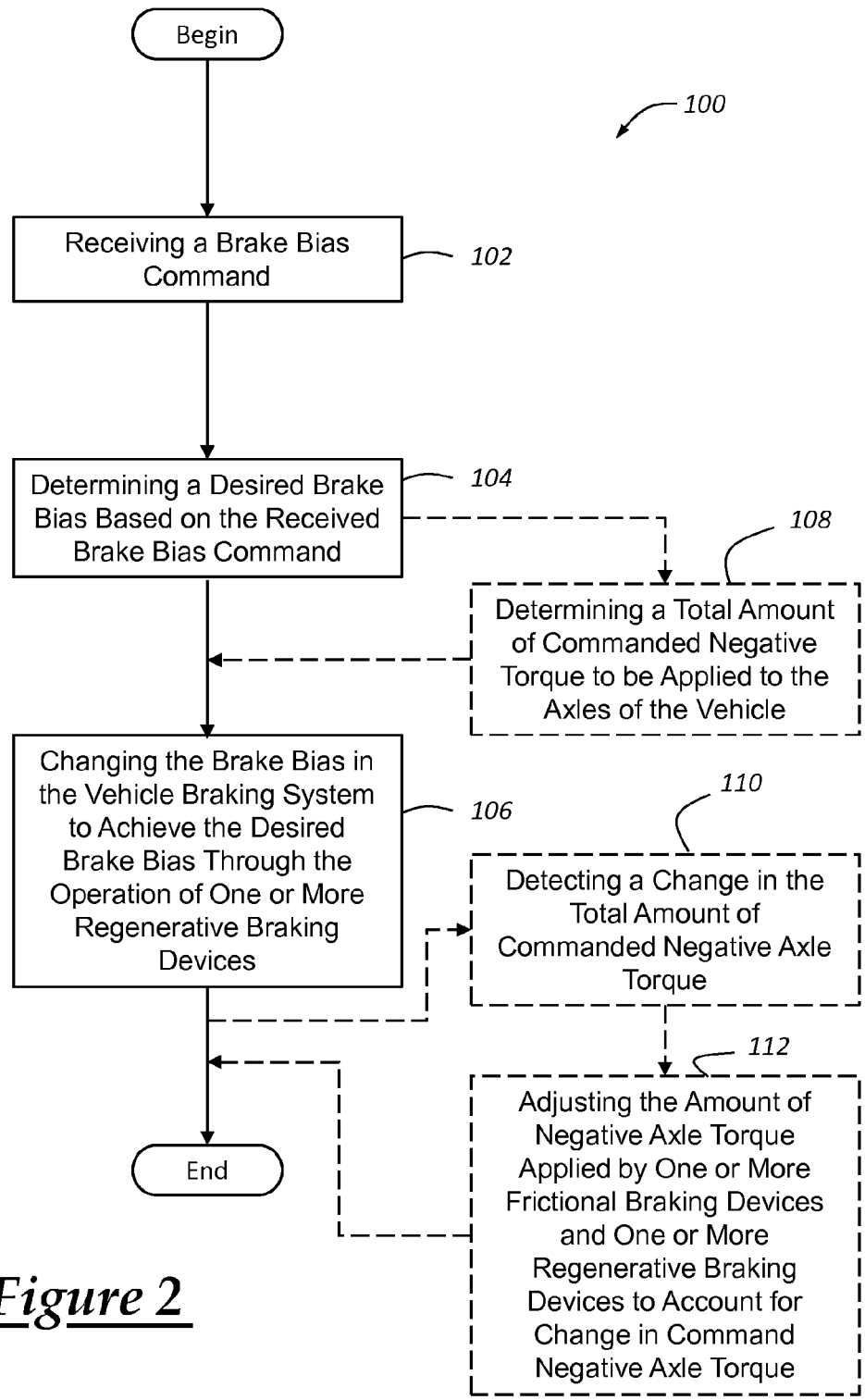

Preferred exemplary embodiments will hereinafter be described in conjunction with the appended drawings, wherein like designations denote like elements, and wherein:

FIG. 1 is a block diagram of an exemplary vehicle braking system that has both regenerative and frictional braking capabilities; and FIG. 2 is a flowchart of an exemplary method that may be used with a vehicle braking system, such as the one shown in FIG. 1.

DESCRIPTION

The method and system described herein may be used to control the overall brake bias in a vehicle braking system that includes both frictional and regenerative braking devices. According to one embodiment, the present method receives a brake bias command, determines a desired brake bias based on the brake bias command, and changes the overall brake bias in the vehicle braking system to achieve the desired brake bias through the operation of one or more regenerative braking devices.

The present method may find application with any number of vehicle braking systems that include both frictional and regenerative braking devices. These include, but are certainly not limited to, brake-by-wire systems, such as an electro-hydraulic braking (EHB) system or an electro-mechanical braking (EMB) system, non-brake-by-wire systems, regenerative braking systems (e.g., those found in hybrid vehicles, battery electric vehicles, etc.), as well as other systems using other types of technologies (e.g., disc brakes, drum brakes, or a combination thereof). It will be appreciated that these are only some of the possibilities as the present method could be used with any vehicle braking system that uses both frictional and regenerative braking devices.

With reference to FIG. 1, there is shown a block diagram of an embodiment of a vehicle braking system 10 that has both frictional and regenerative braking drives and generally includes a brake pedal 12, a brake pedal sensor 14, wheel speed sensors 16 (e.g., $16_1$-$16_4$), an electronic module or control unit 18, a frictional braking subsystem 20, and a regenerative braking subsystem 22. In an embodiment, vehicle braking system 10 may include other components, such as, for example, one or more user input devices 24 (e.g., $24_1$, $24_2$), the purpose and operation of which will be described below. Vehicle braking system 10 and the method described below can be used with a wide variety of vehicles, including a hybrid electric vehicle (HEV), a plug-in hybrid electric vehicle (PHEV), an extended range electric vehicle (EREV), or any other battery electric vehicle (BEV), for example, that utilizes a combination of frictional and regenerative braking to control the speed of the vehicle and to generate electrical energy. In such an arrangement, frictional braking torque (also referred to below as "negative torque" or "negative axle torque" that is applied to the axles of the vehicle by frictional braking devices) may be generated in a conventional manner and counteracts the forward momentum of the vehicle through frictional resistance created by disc brakes, drum brakes, etc. Regenerative braking torque (also referred to below as "negative torque" or "negative axle torque" that is applied to the axles of the vehicle by regenerative braking devices), on the other hand, may be generated by, for example, operating an electric motor in a reverse direction so that it acts as a generator, which in turn creates an electro-magnetically-derived torque that acts against the forward momentum of the vehicle (this process also charges a battery that can later be used to propel/power the vehicle).

Brake pedal 12 is a pedal or lever that is operated by a user (e.g., the driver of the vehicle) to provide brake commands to vehicle braking system 10 and, according to this particular embodiment, is monitored by brake pedal sensor 14. In a brake-by-wire application, like the EHB system shown in FIG. 1, brake pedal 12 may be mechanically coupled to a brake pedal simulator or emulator by way of a spring mechanism or the like for conveying the expected mechanical feel to the driver. The brake pedal simulator may also include other mechanical and/or electronic components, including sensors, etc. Skilled artisans will appreciate that brake pedal 12 may also be mechanically coupled to a master cylinder, for example, which acts as a mechanical backup in the event that the brake-by-wire system experiences some type of malfunction.

Any number of different sensors, components, devices, modules, subsystems, systems, etc. may provide vehicle braking system 10 with information or input that could be used with the present method. These include, for example, the sensors shown in FIG. 1, as well as others that are known in the art but are not shown here. It should be appreciated that brake pedal sensor 14, wheel speed sensors 16, as well as any other sensor located in and/or used by vehicle braking system 10 may be embodied in hardware, software, firmware or some combination thereof. These sensors may directly sense or evaluate the conditions for which they are provided, or they may indirectly evaluate such conditions based on information provided by other sensors, components, devices, modules, subsystems, systems, etc. Furthermore, these sensors may be directly coupled to electronic module 18, indirectly coupled via other electronic devices, coupled over a vehicle communications bus, network, etc., or coupled according to some other arrangement known in the art. In addition, these sensors may be integrated within a vehicle component, device, module, subsystem, system, etc. (e.g., sensors provided within an engine control module, an energy management system, etc.), they may be stand-alone components (as schematically shown in FIG. 1), or they may be provided according to some other arrangement. It is possible for any one of the sensor signals described below to be provided by an engine control module, a transmission control module, a brake control module, a traction control module, or some other component, device, module, subsystem, system, etc. instead of being directly provided by an actual sensor element. In some instances, multiple sensors might be employed to sense a single parameter (e.g., as a means for providing signal redundancy). These are only some of the possibilities, as any type of sensor or sensor arrangement known in the art could also be used.

Brake pedal sensor 14 provides vehicle braking system 10 with a brake signal that is generally representative of the position, movement, exerted force, and/or state of the brake pedal. Thus, the brake signal is generally representative of driver braking demand or driver braking intent, which may be referred to herein as a "driver brake command" or simply "brake command." Any number of different types of brake pedal sensors may be used; these include non-contact-type sensors (e.g., optical sensors, electro-magnetic sensors, etc.), contact-type sensors (e.g., potentiometers, contact switches, etc.), as well as those that measure the force that the driver exerts against the brake pedal, to name a few. In a brake-by-wire application, brake pedal sensor 14 may be integrated with a brake pedal simulator or emulator that conveys the expected mechanical feel of the brake pedal to the driver, as well as provides a brake signal.

Vehicle speed sensors 16 provide vehicle braking system 10 with speed signals that are indicative of the rotational speed or velocity of the wheels of the vehicle, and hence the overall velocity of the vehicle. A variety of different speed sensors and sensing techniques may be used, including those that use rotational wheel speed, ground speed, accelerator pedal position, clutch pedal position, gear shifter selection, vehicle acceleration, engine speed, transmission output speed, and throttle valve position, to name a few. In one embodiment, individual wheel speed sensors $16_1$-$16_4$ are coupled to each of the vehicle's four wheels and separately report the rotational velocity of the four wheels. Skilled artisans will appreciate that these sensors may operate according to optical, electromagnetic or other technologies, and that vehicle speed sensors 16 are not limited to any particular speed sensor type. In another embodiment, the speed sensors could be coupled to certain parts of the vehicle, such as an output shaft of the transmission or behind the speedometer, and produce speed signals from these measurements. It is also possible to derive or calculate speed signals from acceleration signals (skilled artisans appreciate the relationship between velocity and acceleration readings). In another embodiment, one or more speed sensors could determine vehicle speed relative to the ground by directing radar, laser or other signals towards the ground and analyzing the reflected signals, or by employing feedback from a Global Positioning System (GPS). It is possible for the speed signals to be provided to vehicle braking system 10 by some other module, subsystem, system, etc., like an engine control module (ECM).

Electronic module 18 may include any combination of electronic processing devices, memory devices, input/output (I/O) devices, and/or other known components, and may perform various control and/or communication related functions. In an exemplary embodiment, electronic module 18 includes an electronic memory device 26 and an electronic processing device 28. These modules may be embodied in hardware, software, or some combination thereof. Depending on the particular embodiment, electronic module 18 may be a single standalone unit or module, it may be incorporated or included within one or more other electronic modules or systems, it may be part of a larger network or system (e.g., an antilock braking system (ABS), a stability control system, a traction control system, a vehicle integrated control module (VICM), a motion and energy control (MEC) module, a hybrid control module, etc.), or it could embody a combination of these arrangements, to name a few possibilities. According to one embodiment, electronic module 18 is an electronic brake control module (EBCM) that controls a combination of frictional and regenerative braking operations. In such an arrangement it may control frictional braking subsystem 20 and/or regenerative braking subsystem 22 via command signals sent to these systems. The present method is not limited to any particular embodiment.

Electronic memory device 26 may include any type of suitable electronic memory means and may store a variety of data, information and/or electronic instructions. This includes, for example, sensed vehicle conditions (e.g., those provided by sensors 14 and 16), look-up tables and other data structures, algorithms (e.g., electronic instructions and other information used to implement the method described below), vehicle component characteristics and background information (e.g., operational settings, etc. for the different vehicle components), etc. The method described below—as well as any combination of electronic instructions and information needed to perform such an algorithm—may be stored or otherwise maintained in memory device 26.

Electronic processing device 28 may include any type of suitable electronic processor (e.g., a microprocessor, a microcontroller, an application specific integrated circuit (ASIC), etc.) that executes electronic instructions for software, firmware, programs, algorithms, scripts, etc. The exemplary processing device 28 is not limited to any one type of component or device. Electronic module 18 may be electronically connected to other vehicle devices, modules, systems, etc. via a suitable connection and can interact with them as required. These are, of course, only some of the possible arrangements, functions and capabilities of electronic module, as others are certainly possible.

Frictional braking subsystem 20 is shown here as an electro-hydraulic braking (EHB) system, although it may be an electro-mechanical or other type of braking system, that generates frictional braking torque in a conventional manner. According to this exemplary embodiment, frictional braking subsystem 20 includes a hydraulic unit 30 that is hydraulically coupled to one or more braking units or braking devices (also referred to herein as frictional braking devices) 32 (e.g., $32_1$-$32_4$) which are located out at each of the vehicle wheels or corners. Although hydraulic unit 30 is schematically shown as having a separate hydraulic control unit 34, accumulator 36, master cylinder 38, and one or more actuator(s) 40 co-located with one another, it should be appreciated that any combination of these and/or other devices could instead be provided according to a number of other arrangement known in the art. For example, hydraulic control unit 34 could be integrated within EBCM 18 or some other module and be connected to actuator(s) 40 via electrical connections. Hydraulic control unit 34 may interact with EBCM 18 and act as an intermediary or driver for the various electromechanical actuators and devices in frictional braking subsystem 20. In one example, hydraulic control unit 34 receives brake command signals from EBCM 18, processes those signals, and uses them to operate actuator(s) 40 so that the fluid pressure in hydraulic lines 42 is maintained at a desired pressure. In the case of a disc brake embodiment, the fluid pressure drives brake pistons in frictional braking devices $32_1$-$32_4$ and controls their exerted brake force and negative axle torque. Skilled artisans will appreciate that hydraulic control unit 34 may perform any number of different tasks and execute a variety of different instructions, including those of the present method. Because the general structure and operation of accumulators, master cylinders, actuators and other components of hydraulic unit 30 are generally known, further description has been omitted.

Frictional braking devices $32_1$-$32_4$ may be part of any suitable vehicle braking system, including systems associated with disc brakes, drum brakes, electro-hydraulic braking, electro-mechanical braking, regenerative braking, brake-by-wire, etc. In an exemplary embodiment, braking devices $32_1$-$32_4$ are each located out at a vehicle corner and are each operatively coupled to an axle of the vehicle. As used herein, the phrase "operatively coupled" is intended to encompass both the direct coupling of a braking device (e.g., a braking device 32) to an axle of the vehicle (e.g., the direct coupling of the braking device, and/or a particular component thereof, to the axle), as well as the indirect coupling of a braking device (e.g., a braking device 32) to an axle of the vehicle via one or more intermediate components (e.g., the indirect coupling of the braking device, and/or a component thereof, to the axle via or through one or more additional components of the vehicle or vehicle braking system 10). Accordingly, a braking device that is "operatively coupled" to an axle may be either directly or indirectly coupled.

As illustrated with respect to braking device $32_4$ in FIG. 1, each braking device 32 generally includes a rotor 44, caliper 46, brake piston 48, and brake pads (not shown) and may be part of an electro-hydraulic braking (EHB) system or some other type of system. As is appreciated by skilled artisans, a tire-wheel assembly (not shown) is attached to a hub with several lug nuts so that the tire, wheel, hub, and rotor 44 all co-rotate together. Brake caliper 46 straddles rotor 44 and carries brake piston 48 so that a compressive and frictional braking force or torque can be applied by brake pads to opposing sides of the rotor during a braking event. The frictional brake forces/torque slow the rotation of rotor 44 and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. It should be appreciated that the method and system described herein are not limited to use with disc braking systems and could be used with other braking systems and arrangements, including electro-mechanical brakes having electric calipers (e-calipers) and drum braking systems.

Skilled artisans will appreciate that frictional braking subsystem 20 will have a brake bias associated therewith. In embodiment wherein the vehicle has a first axle and a second axle, this brake bias will be the ratio in which the total amount of negative axle torque applied by the frictional braking subsystem is distributed to the first and second axles by the braking devices 32 operatively coupled thereto. For example, in the embodiment illustrated in FIG. 1, if frictional braking devices $32_1$ and $32_2$ are operatively coupled to a first axle of the vehicle and braking devices $32_3$ and $32_4$ are operatively coupled to a second axle, the brake bias in frictional braking subsystem 20 would be the ratio between the percentage of the total negative torque that is applied to the first axle by braking devices $32_1$ and $32_2$ compared to the percentage of the total negative torque that is applied to the second axle by braking devices $32_3$, $32_4$. This brake bias may be defined or set during the design and/or manufacture of the vehicle, and, in an embodiment, is a static ratio meaning that it cannot be adjusted by a user (e.g., driver) during operation of the vehicle. For example, assume that the commanded brake torque is 1,000 Nm and that the brake bias in the frictional braking subsystem 20 is 50/50. If the frictional braking subsystem 20 was the only braking subsystem to apply the required negative axle torque, negative torque in an amount of 500 Nm would be applied to each of the first and second axles by the braking devices 32 coupled thereto, and the 50/50 ratio or bias would remain the same (i.e., at 50/50) throughout the braking event. Skilled artisans will appreciate that while in the example above the brake bias was a 50/50 ratio, the present disclosure is not intended to be limited to such a ratio.

Regenerative braking subsystem 22 uses electromagnetically-derived regenerative braking or negative axle torque to counteract the forward rotation of the vehicle wheels and may include a regenerative unit 50 having a control unit 52 and a motor/generator 54. Regenerative control unit 52 may control or manage certain aspects of the regenerative braking operations, including aspects of the present method, and may interact with EBCM 18, hydraulic control unit 34 and/or some other component, device, module, system, etc. in the vehicle. Motor/generator 54 may include both a motor and a generator (a so-called "mogen") for generating both positive torque (acceleration) and negative torque (braking). Each motor/generator 54 may be operatively coupled to one or more drivetrain component(s), including output shafts, axles, vehicle wheels, etc., and may use the rotation of the drivetrain component(s) to slow down the vehicle and to generate electrical energy for charging a battery (not shown). While FIG. 1 schematically depicts motor/generator 54 as a single combined device, the motor and generator could be split and provided as two separate devices, or multiple motors/generators could be provided (e.g., separate motors/generators for the front and rear wheels (i.e., separate motors/generators for each axle) separate motors/generators for each wheel, separate motors/generators for different functions, etc.), to cite a few possibilities. Motor/generator 54 may include AC motors (e.g., a three phase AC induction motor), DC motors, brushed or brushless motors, permanent magnet motors, etc., and may include a variety of components, like cooling features, sensors, control units and/or any other suitable components known in the art.

As briefly described above, vehicle braking system 10 may also include one or more user input devices 24 that are configured to allow a user (e.g., driver) to input commands to the braking system 10. In an embodiment, each user input device 24 is electrically connected to, and configured for communication with, EBCM 18 such that commands generated by user input device 24 are received by EBCM 18, which then executes those commands. The input commands originating from or initiated at or through user input device(s) 24 may comprise commands relating to one or more characteristics of the overall brake bias in vehicle braking system 10 (as opposed to the brake bias in frictional braking subsystem 20 described above, to which the brake bias commands initiated through user input device(s) 24 do not relate). For example, using the user input device(s) 24, a user may be able to initiate one or more brake bias commands to select or designate which axle the negative torque applied to the axles of the vehicle by the frictional and/or regenerative braking subsystem(s) is biased towards, the magnitude of the overall brake bias in braking system 10 (e.g., 60/40 towards the front axle, 60/40 towards the rear axle, etc.), or both. Accordingly, in an embodiment, when a user manipulates user input device(s) 24 to command that certain action be taken relating to braking system 10, one or more electrical signals representative of the user's command(s) are generated and communicated to EBCM 18. EBCM 18 receives the electrical signal(s) and then executes the input command(s) represented thereby by making, or commanding to be made, appropriate adjustments to the operation of frictional braking system 20 and/or regenerative braking subsystem 22.

In an embodiment, a single user input device 24 may be provided, while in other embodiments, multiple (e.g., two) devices 24 may be provided. For example, in the illustrative embodiment depicted in FIG. 1, a pair of user input devices 24$_1$, 24$_2$ are provided. In such an embodiment, user input device 24$_1$ may be used to initiate brake bias commands relating to a first (e.g., front) axle of the vehicle (e.g., to command that the bias in braking system 10 be towards the front axle and/or to command a particular magnitude of the bias), and user input device 24$_2$ may be used to initiate brake bias commands relating to a first (e.g., rear) axle of the vehicle (e.g., to command that the bias in braking system 10 be towards the rear axle and/or to command a particular magnitude of the bias). Regardless of the particular number of user input devices 24 that braking system 10 includes, each user input device 24 may take any number of forms, including, for example and without limitation, one or a combination of: push-buttons; paddles/levers; steering column-mounted controls located adjacent the steering wheel; virtual buttons or icons displayed on a touch screen display; or any other suitable user-selectable device that when manipulated by a user results in the generation of one or more electrical signals representative of the user's input command(s).

To better illustrate, in one non-limiting example, each user input device 24 comprises a combination of a moveable lever or paddle and a potentiometer. The paddle is mechanically coupled to the potentiometer, and the output of the potentiometer is electrically connected to the EBCM 18. The manipulation of the paddle (e.g., pushing or pulling) results in a change in the voltage output of the potentiometer, which EBCM 18 may use to determine one or more characteristics of a brake bias command generated in response to the manipulation of the paddle. For example, in one embodiment, the initial pulling of the paddle is indicative of a command to bias the negative torque applied to the front and rear axles of the vehicle towards the axle corresponding to or associated with that particular paddle. In response to the pulling of the paddle, a voltage signal will be received by EBCM 18, which will then execute the command. The further pulling of the paddle is indicative of a command to adjust the magnitude of the bias, and also results in a change in the voltage output of the potentiometer. EBCM 18 is configured to recognize this change in voltage, and to use it to execute the commanded change in bias magnitude. While one particular example of a user input device has been provided above, skilled artisans will appreciate that the present disclosure is not intended to be limited to any particular user input device(s); rather, any number of suitable devices known in the art may be used instead.

Again, the preceding description of vehicle braking system 10 and the drawing in FIG. 1 are only intended to illustrate one potential embodiment and the following method is not confined to use with only that system. Any number of other system arrangements, combinations and architectures, including those that differ significantly from the one shown in FIG. 1, may be used instead.

Turning now to FIG. 2, there is shown an embodiment of a method 100 for controlling the overall brake bias in a vehicle braking system that has both frictional and regenerative braking devices. The overall brake bias relates to the amount of negative torque that is be applied to one axle of the vehicle by one or more braking devices (i.e., frictional and/or regenerative) operatively coupled thereto during a braking event as compared to the amount of negative torque that is be applied to another axle of the vehicle by one or more braking devices (i.e., frictional and/or regenerative) operatively coupled thereto. In certain instances, the overall brake bias may be the same ratio as that of the brake bias in the frictional braking subsystem of the vehicle braking system. In other instances, however, the two brake biases will be different because the overall brake bias takes into account not only the negative torque applied by the frictional braking devices, but also that applied by regenerative braking devices, whereas the brake bias of the frictional braking subsystem only takes into account the negative torque applied by the frictional braking devices. For purposes of illustration, method 100 will be described in the context of vehicle braking system 10 illustrated in FIG. 1 and described above. It will be appreciated, however, that the application of the present methodology is not meant to be limited to any particular vehicle braking system(s) and/or braking system configurations(s) or arrangement(s). Additionally, it will be appreciated that unless otherwise noted, the performance of method 100 is not meant to be limited to any one particular order or sequence of steps, or to any particular component(s) for performing the steps.

In an embodiment, method 100 includes a step 102 of receiving a brake bias command. The brake bias command may be received by, for example, EBCM 18 or another component of braking system 10 that is configured to perform some or all of the steps of method 100, and, as will be described below, may be correspond or relate to one or more aspects or characteristics of the overall brake bias in braking system 10. The brake bias command may be received from any number of suitably-configured sources. For instance, in an embodiment, the brake bias command may comprise a user-initiated brake bias command generated by and received from an appropriately-configured user input device 24 of vehicle braking system 10. More specifically, the brake bias command may be received in response to the manipulation (e.g., pulling, pushing, pressing, turning, etc.) of the user input device by a user (e.g., driver). For example, and without limitation, in an embodiment such as that described above wherein vehicle braking system 10 includes a pair of user input devices $24_1$, $24_2$ in the form of levers or paddles, the manipulation (e.g., pulling) of either paddle results in the generation of an electrical signal representative of a particular brake bias command that may be received by, for example, EBCM 18. In such embodiment, when the user determines that a change in the brake bias would be advantageous or desirable, the user may manipulate the appropriate paddle in an appropriate way to indicate the desired brake bias adjustment, and a corresponding command may be generated and then received by EBCM 18.

In another embodiment, rather than the brake bias command comprising a user-initiated command, the command may be automatically initiated and generated by a component of the vehicle without any user involvement. For example, in an instance wherein the vehicle includes an automated driving feature, the automated driving feature—and the component or system of the vehicle configured to perform the functionality of the automated driving feature, in particular—may be configured to generate an electrical signal representative of a brake bias command that may be received by vehicle braking system 10 (e.g., EBCM 18). In such an embodiment, when the automated driving feature determines or detects that a change in the brake bias would be advantageous or desirable, a command indicative of the desired adjustment may be generated and then received by the EBCM 18. Accordingly, skilled artisans will appreciate that the present disclosure is not intended to be limited to the brake bias command being generated by and received from any particular source(s).

In an embodiment, the brake bias command may be received during a braking event wherein negative torque is applied to a first axle of the vehicle by, for example, one or more frictional braking devices 32 operatively coupled thereto and to a second axle of the vehicle by, for example, one or more other frictional braking devices 32 operatively coupled thereto. Alternatively, the brake bias command may be received before or after, but not during, such a braking event.

Following the receipt of the brake bias command in step 102, method 100 may include a step 104 of determining a desired brake bias based on the brake bias command received in step 102. In an embodiment, this step may comprise determining one or more aspects or characteristics of the desired brake bias, including, for example and without limitation, a desired magnitude of the overall brake bias and/or the desired axle of the vehicle towards which the braking system 10 is to be negative torque applied to the axles of the vehicle by braking system 10 is to be biased. The particular way in which step 104 is performed may depend, at least in part, on the particular brake bias aspect(s) or characteristic(s) for which determinations are to be made.

For example, in an embodiment wherein the magnitude of the desired brake bias is determined in step 104, this determination may be made by evaluating the brake bias command received in step 102 with a predetermined profile or curve (e.g., linear or non-linear) or data structure (e.g., look-up table) that correlates brake bias commands with brake bias magnitudes. By way of example, assume that, as described above, the brake bias command comprises a voltage signal generated in response to the manipulation of a user input device 24. The magnitude of the brake bias may be determined by looking up the magnitude of the voltage signal in an empirically-derived look-up table (e.g., calibration table or curve) stored in or on a suitable memory device (e.g., memory device 26 of EBCM 18, for example) and that correlates voltage magnitude with brake bias magnitude. Similarly, in embodiment wherein the brake bias command is generated by an automated driving feature, the automated driving feature may be configured to monitor one or more vehicle-related parameters (e.g., vehicle speed, steering angle, etc.) and to determine a desired brake bias magnitude based on the monitored parameters using, for example, an appropriately configured data structure (e.g., look-up table, profile, etc.) that correlates values of the monitored parameter(s) with brake bias magnitude.

In an embodiment wherein a determination is additionally or alternatively made as to which axle of the vehicle the negative axle torque is to be biased towards, this determination may be made by, for example, detecting or determining which user input device the brake bias command was received from in step 102. More particularly, in an embodiment, vehicle braking system 10 may include multiple user input devices 24, each of which is configured to be used to command the adjustment of the brake bias towards a corresponding axle of the vehicle (e.g., in an embodiment wherein there are two (2) user input devices, one may be configured to adjust or command the brake bias towards a first (e.g., front) axle, while the other may be configured to adjust or command the brake bias towards a second (e.g., rear) axle). Accordingly, in such an embodiment, step 104 may comprise first determining which one of two or more user input devices 24 the brake bias command was received from, and then based on that determination, determining which axle of the vehicle the negative axle torque is to be biased towards. In an embodiment wherein a single user input device is used, the determination may be made by based on the particular manner in which the user input device was manipulated. For example, in an instance wherein the user input device comprises a device having a plurality of selectable positions, each corresponding to a particular bias magnitude and an axle towards which the negative axle torque is to be biased (e.g., a first position corresponding to a 60/40 bias towards the first axle, a second position corresponding to a 60/40 bias towards the second axle, etc.), step 104 may comprise determining which axle of the vehicle the negative axle torque is to be biased towards based on the particular position of the user input device. Alternatively, and as with determining the magnitude of the brake bias described above, in an embodiment wherein the brake bias command is generated by an automated driving feature of the vehicle, the automated driving feature may be configured to monitor one or more vehicle-related parameters (e.g., vehicle speed, steering angle, etc.) and to determine which axle of the vehicle the negative axle torque should be biased towards based on the monitored parameter(s) using, for example, an appropriately configured data structure (e.g., look-up table, profile, etc.).

Accordingly, in view of the foregoing, skilled artisans will appreciate that the present disclosure is not intended to be limited to any particular technique(s) for determining the desired brake bias; rather, any number of suitable techniques may be used depending, at least in part, on what aspects/characteristics is/are being determined. Additionally, in an embodiment, EBCM 18 of braking system 10 may be configured determine the desired brake bias, while in other embodiments the determination(s) may be made by another suitable component of braking system 10 or another vehicle system.

In any event, in an embodiment, after the desired brake bias has been determined as described above, it may be recorded in a memory device, for example, memory device 26 of EBCM 18, for use during a future braking event. For instance, the next time a brake command is received through, for example, brake pedal 12, negative torque will be applied to the axles of the vehicle by both the frictional braking devices 32 of frictional braking subsystem 20 and the regenerative braking device(s) 54 of regenerative braking subsystem 22 in amounts that satisfy both a total amount of negative torque corresponding to the brake command and the predetermined desired brake bias.

Once the desired braking bias is determined in step 104, method 100 may move to a step 106 of changing or adjusting the overall brake bias in the vehicle braking system to achieve the desired brake bias determined in step 104. Step 106 may be performed in a number of ways.

For example, in one embodiment, step 106 may comprise initiating a braking event and adjusting the overall brake bias in braking system 10 through the operation of regenerative braking subsystem 22, and, in particular, one or more regenerative braking devices 54 thereof, which are each operatively coupled to an axle of the vehicle. More particularly, step 106 may comprise controlling the operation of one or more of the regenerative braking devices 54 to apply negative torque in an appropriate amount or amounts (in an instance where multiple regenerative braking devices are applying negative torque) to one or more axles of the vehicle in order to achieve the desired brake bias. Accordingly, in an embodiment, EBCM 18 of braking system 10, or another suitable component that is configured to perform step 106, may generate one or more command signals and communicate that or those signals to regenerative braking subsystem 22, which may then execute the commands by applying, or causing to be applied, the designated amount(s) of negative torque to the axle(s) to which the regenerative braking device(s) 54 is/are operatively coupled. In an embodiment, the negative axle torque applied by the regenerative braking device(s) 54 is at least initially the only negative torque applied to the axles of the vehicle (i.e., no negative axle torque is applied by the frictional braking device(s) 32 of frictional braking subsystem 20). Accordingly, in such an embodiment, braking of the vehicle may be initiated without any actuation or engagement of brake pedal 12 of braking system 10.

In another embodiment, step 106 may comprise changing the overall brake bias through the operation of one or more regenerative braking devices 54 of regenerative braking subsystem 22. In another embodiment, the overall brake bias may be changed through the operation of a combination of one or more regenerative braking devices 54 and one or more frictional braking devices 32 of regenerative and frictional braking subsystems 20, 22, respectively. More particularly, and as will be described in greater detail below, in an embodiment wherein the vehicle has a first axle and a second axle, step 106 may comprise changing the brake bias to achieve the desired brake bias by controlling the operation of the regenerative braking device(s) 54 operatively coupled to each of the first and second axles. Accordingly, in such an embodiment, EBCM 18 of braking system 10, or another suitable component that is configured to perform step 106, may generate one or more command signals and communicate that or those signals to regenerative braking subsystem 22, which may then execute the commands by applying, or causing to be applied, the designated amount(s) of negative torque to the axle(s) to which the regenerative braking device(s) 54 is/are operatively coupled. In another embodiment, however, step 106 may comprise controlling the operation of the frictional braking devices 32 operatively coupled to the first axle (and applying negative torque thereto) and/or the frictional braking devices 32 operatively coupled to the second axle (and applying brake torque thereto), and the regenerative braking devices 54 operatively coupled to the first axle and/or the regenerative braking devices 54 operatively coupled to the second axle. Accordingly, in such an embodiment, EBCM 18 of braking system 10, or another suitable component that is configured to perform step 106, may generate one or more command signals and communicate that or those signals to both frictional braking system 20 and regenerative braking subsystem 22, which may then execute the commands by applying, or causing to be applied, the designated amount(s) of negative torque to the axle(s) to which the appropriate frictional and regenerative braking device(s) 32, 54 are operatively coupled.

Skilled artisans will appreciate that in an instance wherein step 106 is performed during the occurrence of a braking event, the braking event will be in response to a brake command initiated by, for example, a user via brake pedal 12 of vehicle braking system 10, or an automated driving feature of the vehicle. As such, it will be further appreciated that the brake command will have a particular commanded negative axle torque associated therewith, which corresponds to the total amount of negative torque to be applied to the axles of the vehicle by the combination of the frictional braking subsystem 20 and regenerative braking subsystem 22 during the commanded braking event (i.e., the total amount of commanded negative torque). For example, when brake pedal 12 is in a first position or has traveled a first distance upon actuation by the user, that first position or first distance may have a first commanded negative axle torque associated therewith. Similarly, when brake pedal 12 is in a second position or has traveled a second distance different than the first position or distance, that second position or distance may have a second commanded negative axle torque associated therewith.

In any event, because the commanded negative axle torque corresponds to a particular brake command, it will be appreciated that it may not be desirable to adjust the total amount of brake torque being applied to the axles of the vehicle when the overall brake bias is changed in step 106. More particularly, an increase in the total amount of brake torque being applied to the axles to achieve the desired brake bias may result in the deceleration or braking of the vehicle in a way that is unexpected to the user, and possibly uncomposed (i.e., rather than the vehicle decelerating or braking in a smooth, composed manner, the deceleration may change abruptly). Accordingly, it may be desirable to maintain the total amount of brake torque applied to the axles of the vehicle when the overall brake bias is changed in step 106 at a level that is approximately equal to the total amount of negative axle torque commanded during the underlying braking event (i.e., the total amount of applied negative torque=the total amount of commanded negative axle torque). Thus, in an embodiment, method 100 may include a step 108 performed prior to step 106 that comprises determining the total amount of commanded negative torque to be applied to the axles of the vehicle (e.g., the first and second axles of the vehicle in an embodiment wherein the vehicle has two axles) during the underlying braking event.

Skilled artisans will appreciate that step 108 may be performed in any number of ways. In one example, step 108 comprises receiving a brake command and then using it to determine the total amount of commanded negative axle torque. For instance, in one non-limiting example, one or more electrical signals may be received from, for example, one or more sensors of the vehicle (e.g., brake pedal sensor 14) or another system of the vehicle that is/are representative of a user-initiated (e.g., via brake pedal 12) or vehicle system-initiated (e.g., via an automated driving feature) brake command. For example, a signal may be received that is indicative or representative of a distance of travel of the brake pedal, and therefore, representative of a brake command. This signal may then be used with an empirically-derived data structure (e.g., look-up table), or in any other suitable way, to determine the amount of negative axle torque corresponding to that brake command, and therefore, the total commanded negative axle torque. It will be appreciated that while only one way of performing step 108 has been described in detail, other suitable ways may also be used, and therefore, the present disclosure is not intended to be limited to any particular way(s) of doing so. In any event, step 108 may be performed by EBCM 18 of braking system 10 or another suitable component of braking system 10 or another vehicle system.

Turning back to step 106, and as briefly described above, in an embodiment wherein the overall brake bias in vehicle brake system 10 is being changed during a braking event, step 106 may comprise changing the overall brake bias to achieve the desired brake bias through the operation of one or more frictional braking devices 32 and/or one or more regenerative braking devices 54. Exactly how those braking devices are operated may be dependent upon, among potentially other factors, the nature of the commanded change in the overall brake bias.

For example, in certain instances, such as when the overall brake bias is being changed from a balanced arrangement or configuration (i.e., 50/50) to an arrangement or configuration wherein braking system 10 is biased toward one of a first or second axle, step 106 may comprise controlling the operation of one or more frictional braking devices 32 to adjust (decrease) the amount of negative torque applied to the first and/or second axles by that or those frictional braking device(s) 32 operatively coupled thereto, while also controlling one or more regenerative braking devices 54 to adjust (increase) the amount of negative torque applied to the axle towards which braking system 10 is to be biased by that or those regenerative braking device(s) 54 operatively coupled thereto. In other instances, such as, for example, when the overall brake bias remains biased towards one of the axles but the magnitude of that bias is changed (e.g., reduced), rather than decreasing the negative torque applied by the frictional device(s) 32 and increasing the negative torque applied by the regenerative braking device(s) 54, step 106 may comprise controlling the operation of one or more of the frictional braking devices 32 to adjust (increase) the amount of negative torque applied to the first and/or second axles by that or those frictional braking device(s) 32 operatively coupled thereto, while also controlling one or more regenerative braking devices 54 to adjust (decrease) the amount of negative torque applied to the axle towards which braking system 10 is to be biased by the regenerative braking device(s) 54 operatively coupled thereto. In yet other instances, such as, for example, when the overall brake bias is changed from one axle to another, step 106 may comprise controlling the operation of one or more regenerative braking devices 54 to adjust (decrease) the amount of negative torque applied to the axle towards which the negative axle torque was previously or originally biased by the regenerative braking device(s) 54 operatively coupled thereto, while also controlling the operation of one or more other regenerative braking devices 54 to adjust (increase) the amount of negative torque applied to the axle towards which the negative axle torque is now to be biased by the regenerative braking device(s) 54 operatively coupled thereto. Accordingly, the present disclosure is not limited to any particular manner in which the operation of frictional braking device(s) 32 and/or regenerative braking device(s) 54 are controlled.

In any event, in an embodiment, the amount by which the negative torque applied by one or more braking devices (either frictional or regenerative) is increased in step 106 is approximately equal to the amount by which the negative torque applied by one or more other braking devices (either frictional or regenerative) is decreased. For example, in an embodiment wherein the negative torque applied by one or more frictional braking device(s) 32 is decreased, and that applied by one or more regenerative braking device(s) 54 is increased, the amount by which the negative torque applied by the frictional braking device(s) 32 is decreased is approximately equal to the amount by which the negative torque applied by the regenerative braking device(s) 54 is increased. As such, the total amount of negative torque applied does not change as a result of the change in the overall brake bias in braking system 10 (i.e., the net change in the total amount of applied negative torque is approximately equal to zero), rather only the source(s) of the negative torque and/or the amount of negative torque applied by each source changes. Accordingly, the total amount of negative torque applied to the first and second axles before, during, and after the change in brake bias in step 106 is maintained at a level that is approximately equal to the total amount of commanded negative axle torque. In the context of the relationship between the change or adjustments in the negative torque applied by various braking devices, the phrase "approximately equal to" (e.g., the net change is "approximately equal to zero") is intended to include instances wherein the net change in negative torque is exactly zero (i.e., instances wherein the amount by which the negative torque is increased is exactly equal to the amount by which the negative torque is decreased), and those instances wherein the net change is not exactly zero, but is within a tolerance that would not result in noticeable change in the negative torque to, for example, the user of the vehicle, and that would nonetheless allow for the expected and composed deceleration or braking of the vehicle. Similarly, in the context of the relationship between the total amount of applied negative torque and the total amount of commanded negative torque, the phrase "approximately equal to" is intended to include instances wherein the total amounts of applied and commanded negative torque are exactly equal, and those wherein the amounts are not exactly equal but the difference therebetween is within a tolerance that would not result in noticeable change in the negative torque to, for example, the user of the vehicle, and that would nonetheless allow for the expected and composed deceleration or braking of the vehicle.

The particular amounts by which the negative torque applied by the frictional braking device(s) and/or regenerative braking device(s) is/are changed or adjusted in step 106 may be determined in a number of ways. For example, in an embodiment, EBCM 18 of braking system 10 may be configured to execute one or more equations or algorithms to determine how to distribute the total amount of commanded brake torque amongst the various braking devices in order to achieve the desired brake bias while also maintaining the total amount of negative torque applied to the vehicle axles at a level that is approximately equal to the total amount of commanded negative axle torque. Alternatively, using the total commanded negative axle torque and the desired brake bias (and, in an embodiment, the predetermined brake bias between the frictional braking devices 32 coupled to the first and second axles, respectively), the distribution may be determined from an empirically-derived data structure (e.g., a single- or multi-dimensional look-up table), or it may be determined using any other suitable technique or method.

Once the respective amounts by which the negative torque applied by the frictional braking device(s) 32 and/or regenerative braking device(s) 54 is/are determined, EBCM 18 may generate one or more command signals and communicate that or those signals to the appropriate braking subsystem (s) (i.e., frictional braking subsystem 20 and/or regenerative braking subsystem 22). The braking subsystem(s) may then execute the received command(s) by applying or causing to be applied the designated amount of negative torque to the appropriate axles.

To better illustrate the operation or functionality of step 106, several non-limiting examples of the performance of step 106 will now be provided.

In a first example, assume that prior to the receipt of a brake bias command in step 102, the overall brake bias in vehicle braking system 10 is 50/50, and that the total commanded negative axle torque is 1,000 Nm, and the static, non-adjustable brake bias in the frictional braking system 20 is also 50/50. Prior to a change in the overall brake bias in vehicle braking system 10, 500 Nm of negative torque is distributed to each of the first axle and second axle in accordance with the 50/50 bias. Assume now that a brake bias command is received in step 102, and a desired brake bias of 60/40 toward the first axle is determined in step 104. Step 106 may comprise controlling the frictional braking devices 32 operatively coupled to each of the first and second axles to decrease the amount of negative torque applied thereby from 500 Nm per axle to 400 Nm per axle, and to control one or more regenerative braking devices 54 operatively coupled to the first axle to increase the negative torque applied thereby to 200 Nm, to thereby achieve an overall brake bias of 60/40 toward the first axle, while also maintaining a total applied negative torque of 1,000 Nm, which is equal to the total amount of commanded negative axle torque.

Now assume that in a subsequent iteration of method 100, a brake bias command is received in step 102, and a desired brake bias of 55/45 toward the first axle is determined in step 104 (i.e., the brake bias is to be changed from 60/40 to 55/45 toward the first axle). Assume further that the total commanded negative torque is still 1,000 Nm, and that the static, non-adjustable brake bias in the frictional braking subsystem 20 is still 50/50. Step 106 may comprise controlling the frictional braking devices 32 coupled to each of the first and second axles to increase the amount of negative torque applied thereby from 400 Nm per axle to 450 Nm per axle, and to control the one or more regenerative braking devices 54 coupled to the first axle to decrease the negative torque applied thereby from 200 Nm to 100 Nm, to thereby achieve an overall brake bias of 55/45 toward the first axle, while also still maintaining a total applied negative torque of 1,000 Nm, which is equal to the total amount of commanded brake torque.

Finally, rather than the overall brake bias in braking system 10 being changed from 60/40 to 55/45, as was done in the previous example, assume that in the subsequent iteration of method 100, the desired overall brake bias was determined in step 104 to be 65/35 toward the first axle (i.e., the brake bias is to be changed from 60/40 to 65/35 toward the first axle). Assume further that the total commanded negative torque is still 1,000 Nm, and that the static, non-adjustable brake bias in frictional braking subsystem 20 is still 50/50. Step 106 may comprise controlling the frictional braking devices 32 coupled to each of the first and second axles to decrease the amount of negative torque applied thereby from 400 Nm per axle to 350 Nm per axle, and to control the one or more regenerative braking devices 54 coupled to the first axle to increase the negative torque applied thereby from 200 Nm to 300 Nm, to thereby achieve an overall brake bias of 65/35 toward the first axle, while also still maintaining a total applied negative torque of 1,000 Nm, which is equal to the total amount of commanded negative torque.

In another example, assume that the overall brake bias in braking system 10 is being changed from one axle to another, and more particularly, and for purposes of illustration only, assume that the overall brake bias is being changed from 60/40 toward the first axle to 60/40 toward the second axle. Assume further that: the total commanded negative axle torque is once again 1,000 Nm; the static, non-adjustable brake bias in frictional braking subsystem 20 is still 50/50; the amount of negative torque applied to each of the first and second axles by the frictional braking devices 32 operatively coupled thereto is 400 Nm per axle; and the amount of negative applied to the first axle by the regenerative braking device (s) 54 coupled thereto is 200 Nm. In this instance, step 106 may comprise controlling the regenerative braking device(s) 54 coupled to the first axle to decrease the amount of negative torque applied thereby from 200 Nm to substantially 0 Nm, and to control the regenerative braking device(s) 54 coupled to the second axle to increase the negative torque applied thereby from substantially 0 Nm to 200 Nm, to thereby achieve an overall brake bias of 60/40 toward the second axle, while also still maintaining a total applied negative torque of 1,000 Nm, which is equal to the total amount of commanded negative torque.

It will be appreciated that the examples above are provided for illustrative purposes only, and that the present disclosure is not intended to be limited to those examples and/or the particular negative torque and/or bias values used therein.

In addition to the above, method 100 may further include a number of other steps. For example, in an embodiment, method 100 may include a step 110 of detecting a change in the total amount of commanded negative torque to be applied to the first and second axles of the vehicle during a braking event, and a step 112 of adjusting the amount of negative torque applied to at least one of the first and second axles of the vehicle by one or more frictional braking devices 32 and one or more regenerative braking devices 54 in response to, and to account for, the detected change, while also maintaining the desired brake bias in vehicle braking system 10.

With respect to step 110, skilled artisans will appreciate that a change in the total amount of commanded negative torque may be detected in a number of ways. For example, in an embodiment, EBCM 18 may monitor the output of one or more sensors of the vehicle (e.g., brake pedal sensor 14, vehicle speed sensor(s) 16, etc.) and if a change in the output of the sensor(s) is detected, a change in the total amount of commanded negative torque may also be detected. Alternatively, EBCM 18 may receive a signal from another system of the vehicle indicating that there has been a change in the commanded negative torque. In either instance, the magnitude of the "new" commanded negative torque may be determined in, for example, the same manner as that described above with respect to step 108, and therefore, will not be repeated. Accordingly, it will be appreciated that the present disclosure is not intended to be limited to any particular techniques for detecting a change in the commanded negative torque or the magnitude of that change, but rather any number of suitable techniques may be used.

As briefly described above, in response to the detection of a change in the total amount of commanded negative torque in step 110, step 112, comprises adjusting the amount of negative torque applied to at least one of the first or second axles of the vehicle by one or more frictional braking devices 32 coupled thereto, and the amount of brake torque applied to one of the first or second axles by one or more regenerative braking devices 54 coupled thereto, to account for the detected change while also maintaining the overall brake bias in vehicle braking system 10 at the desired brake bias determined in step 104. In other words, in an embodiment, the negative torque applied to one or both of the first and second axles of the vehicle by one or more frictional braking devices 32 and that applied by one or more regenerative braking devices 54 may be adjusted so that the total applied negative torque is maintained at a level that is approximately equal to the "new" total amount of commanded negative torque, as well as in accordance with the prevailing desired brake bias in vehicle braking system 10. In an embodiment, step 112 may be performed by EBCM 18 of braking system 10.

For purposes of illustration, assume the following: the total commanded brake torque is changed from 1,000 Nm to 1,100 Nm; the prevailing brake bias is 60/40 to the first axle; the negative torque applied to the first and second axles by one or more frictional braking devices 32 coupled thereto is 400 Nm per axle; and the negative torque applied to the first axle by one or more regenerative braking devices 54 coupled thereto is 200 Nm. In step 110, the change in the commanded negative torque from 1,000 Nm to 1,100 Nm would be detected; and in step 112, the following changes may be made to the negative torque applied to the first and second axles: the amount of negative torque applied by the frictional braking devices 32 coupled to the first and second axles is adjusted from 400 Nm per axle to 440 Nm per axle; and the amount of negative torque applied by the regenerative braking device(s) 54 coupled to the first axle is adjusted from 200 Nm to 220 Nm. As such, the total applied negative torque is adjusted to account for the increase in the commanded negative torque (i.e., the total applied negative torque now equals the new commanded negative torque), and the prevailing overall brake bias is maintained.

Now assume that rather than increasing the total commanded negative torque from 1,000 Nm to 1,100 Nm, the commanded negative torque is reduced from 1,000 Nm to 900 Nm. In step 110, the change in the commanded negative torque from 1,000 Nm to 900 Nm would be detected; and in step 114, the following changes may be made to the negative torque applied to the first and second axles: the amount of negative torque applied by the frictional braking devices 32 coupled to the first and second axles is adjusted from 400 Nm per axle to 360 Nm per axle; and the amount of negative torque applied by the regenerative braking device(s) 54 coupled to the first axle is adjusted from 200 Nm to 180 Nm. As such, the total applied negative torque is adjusted to account for the decrease in commanded negative torque (i.e., the total applied negative torque now equals the new commanded negative torque), and the prevailing overall brake bias is maintained.

Accordingly, skilled artisans will appreciate that in vehicle braking systems having both frictional and regenerative braking capabilities, the methodology described above may be used to change the overall brake bias in the braking system through the operation of one or more regenerative braking devices without also changing the total amount of negative torque being applied to the vehicle axles. The methodology may also be used to accommodate a change in the total amount of commanded negative torque to be applied by the braking system during a braking event in which negative torque is being applied to the vehicle axles by both frictional and regenerative braking devices without also changing the overall brake bias in the braking system. Skilled artisans will also appreciate that the above described functionality may be advantageously accomplished by primarily utilizing existing components of the vehicle (e.g., the EBCM, frictional and/or regenerative braking devices, etc.), and therefore, the implementation of the functionality does not substantially or unacceptably increase the cost and complexity associated with the vehicle braking system, and therefore, the vehicle as a whole.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps illustrated in FIG. 2 is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items.

Other terms are to be construed using their broadest reasonable meaning unless they are used in a context that requires a different interpretation.

The invention claimed is:

1. A method of controlling the overall brake bias in a vehicle braking system having both frictional and regenerative braking devices, comprising the steps of:
receiving a brake bias command;
determining a desired brake bias based on the brake bias command, wherein brake bias relates to the amount of negative torque applied to a first axle of the vehicle by one or more braking devices operatively coupled thereto compared to the amount of negative torque applied to a second axle of the vehicle by one or more braking devices operatively coupled thereto; and
changing the overall brake bias in the vehicle braking system to achieve the desired brake bias through the operation of one or more regenerative braking devices;
wherein a brake bias between one or more frictional braking devices operatively coupled to the first axle and one or more frictional braking devices operatively coupled to the second axle remains the same throughout the changing of the overall brake bias.

2. The method of claim 1, wherein determining the desired brake bias comprises evaluating the brake bias command with an empirically derived profile to determine the desired magnitude of the brake bias.

3. The method of claim 1, wherein the receiving step comprises receiving the brake bias command during a braking event wherein negative torque is applied to the first axle of the vehicle by one or more frictional braking devices operatively coupled thereto, and to the second axle of the vehicle by one or more different frictional braking devices operatively coupled thereto.

4. The method of claim 1, wherein the changing step further comprises:
adjusting the amount of negative torque applied to at least one of the first or second axles of the vehicle by one or more frictional braking devices operatively coupled thereto; and
adjusting the amount of negative torque applied to one of the first or second axles of the vehicle by one or more regenerative braking devices operatively coupled thereto.

5. The method of claim 4, wherein the adjustments made to the negative torque applied to the at least one of the first or second axles by the one or more frictional braking devices operatively coupled thereto and the adjustments made to the negative torque applied to the one of the first or second axles by the one or more regenerative braking devices operatively coupled thereto results in a net change in the total amount of applied negative torque that is approximately equal to zero.

6. The method of claim 1, wherein the changing step further comprises:
increasing the amount of negative torque applied to the first axle of the vehicle by one or more regenerative braking devices operatively coupled thereto; and
decreasing the amount of negative torque applied to the second axle of the vehicle by one or more regenerative braking devices operatively coupled thereto.

7. The method of claim 6, wherein the amount by which the negative torque applied to the first axle by the one or more regenerative braking devices operatively coupled thereto is increased is approximately equal to the amount by which the negative torque applied to the second axle by the one or more regenerative braking devices operatively coupled thereto is decreased.

8. The method of claim 1, wherein the brake bias between the one or more frictional braking devices operatively coupled to the first axle and the one or more frictional braking devices operatively coupled to the second axle is approximately 50/50.

9. The method of claim 1, further comprising:
detecting a change in a total amount of commanded negative torque to be applied to the first and second axles of the vehicle during a braking event; and
adjusting the amount of negative torque applied to at least one of the first or second axles of the vehicle by one or more frictional braking devices operatively coupled thereto, and the amount of negative torque applied to one of the first or second axles of the vehicle by one or more regenerative braking devices operatively coupled thereto in response to and to account for the detected change in total commanded negative torque, while also maintaining the desired brake bias.

10. A method of controlling the overall brake bias in a vehicle braking system having both frictional and regenerative braking devices, comprising the steps of:
receiving a brake bias command from a user input device so that a user is able to control the overall brake bias in the vehicle braking system;
determining a desired brake bias based on the brake bias command, wherein brake bias relates to the amount of negative torque applied to a first axle of the vehicle by one or more braking devices operatively coupled thereto compared to the amount of negative torque applied to a second axle of the vehicle by one or more braking devices operatively coupled thereto;
determining a total amount of commanded negative torque to be applied to the first and second axles of the vehicle during a braking event; and
during the braking event, changing the brake bias in the vehicle braking system to achieve the desired brake bias through the operation of one or more frictional braking devices and one or more regenerative braking devices, while also maintaining the total amount of negative torque applied to the first and second axles of the vehicle during the braking event at a level that is approximately equal to the total amount of commanded negative torque.

11. The method of claim 10, wherein the changing step comprises:
adjusting the amount of negative torque applied to at least one of the first or second axles of the vehicle by the one or more frictional braking devices operatively coupled thereto; and
adjusting the amount of negative torque applied to one of the first or second axles of the vehicle by one or more regenerative braking devices operatively coupled thereto.

12. The method of claim 11, wherein the adjustments made to the negative torque applied to the at least one of the first or second axles by the one or more frictional braking devices operatively coupled thereto and the adjustments made to the negative torque applied to the one of the first or second axles by the one or more regenerative braking devices operatively coupled thereto results in a net change in the total amount of applied negative torque that is approximately equal to zero.

13. The method of claim 10, wherein the changing step further comprises:
increasing the amount of negative torque applied to the first axle of the vehicle by one or more regenerative braking devices operatively coupled thereto; and decreasing the amount of negative torque applied to the second axle of the vehicle by one or more regenerative braking devices operatively coupled thereto.

14. The method of claim 13, wherein the amount by which the negative torque applied to the first axle by the one or more regenerative braking devices operatively coupled thereto is increased is approximately equal to the amount by which the negative torque applied to the second axle by the one or more regenerative braking devices operatively coupled thereto is decreased.

15. The method of claim 10, wherein the brake bias between one or more frictional braking devices operatively coupled to the first axle and one or more frictional braking devices operatively coupled to the second axle remains the same throughout the braking event.

16. The method of claim 10, further comprising:
    detecting a change in the total amount of commanded negative torque to be applied to the first and second axles of the vehicle during the braking event; and
    adjusting the amount of negative torque applied to at least one of the first or second axles of the vehicle by one or more frictional braking devices operatively coupled thereto, and the amount of negative torque applied to one of the first or second axles of the vehicle by one or more regenerative braking devices operatively coupled thereto in response to and to account for the detected change in the total amount of commanded negative torque, while also maintaining the desired brake bias.

17. A braking system for a vehicle, comprising:
    one or more regenerative braking devices, each configured to apply negative torque to one of a first axle or a second axle of the vehicle; and
    an electronic module configured to:
        receive a brake bias command;
        determine a desired overall brake bias based on the brake bias command, wherein brake bias relates to the amount of negative torque applied to a first axle of the vehicle by one or more braking devices operatively coupled thereto compared to the amount of negative torque applied to a second axle of the vehicle by one or more braking devices operatively coupled thereto; and
        control the operation of at least one of the one or more regenerative braking devices to change the overall brake bias in the vehicle braking system to achieve the desired brake bias;
    wherein a brake bias between one or more frictional braking devices operatively coupled to the first axle and one or more frictional braking devices operatively coupled to the second axle remains the same while the overall brake bias is chanced.

18. The system of claim 17, wherein the one or more regenerative braking devices comprises one or more electric motors of the vehicle.

19. The system of claim 17, further comprising one or more frictional braking devices, each configured to apply negative torque to one of the first or second axles of the vehicle, wherein the electronic module is further configured to:
    control the operation of at least one of the one or more frictional braking devices to increase or decrease the amount of brake torque applied thereby; and
    control the operation of at least one of the one or more regenerative braking devices to
    increase or decrease the amount of brake torque applied thereby.

* * * * *